March 8, 1927.
W. R. TORBERT
AWNING STRUCTURE
Filed Nov. 5, 1926
1,620,500
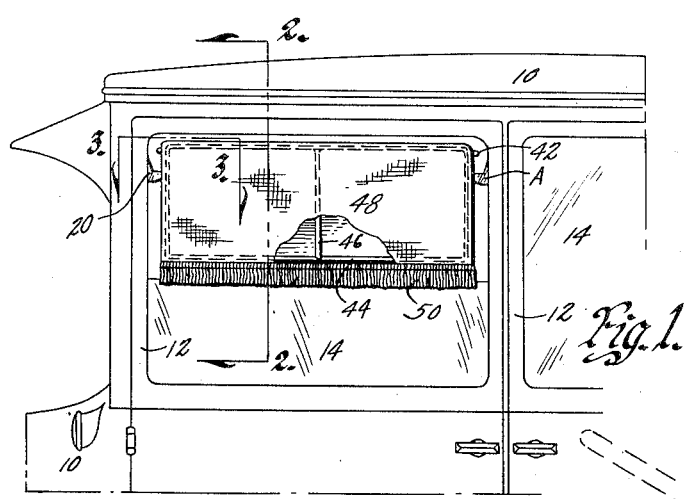
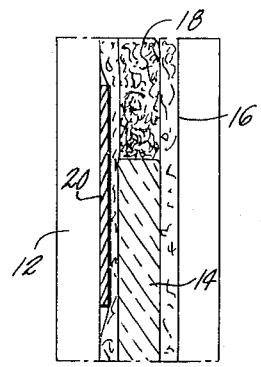
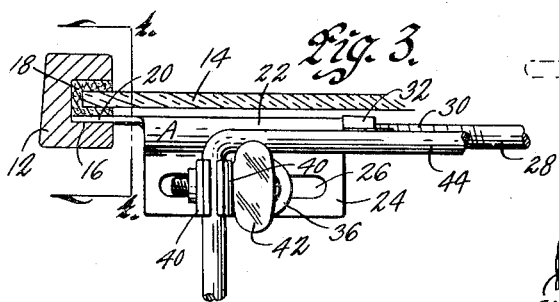
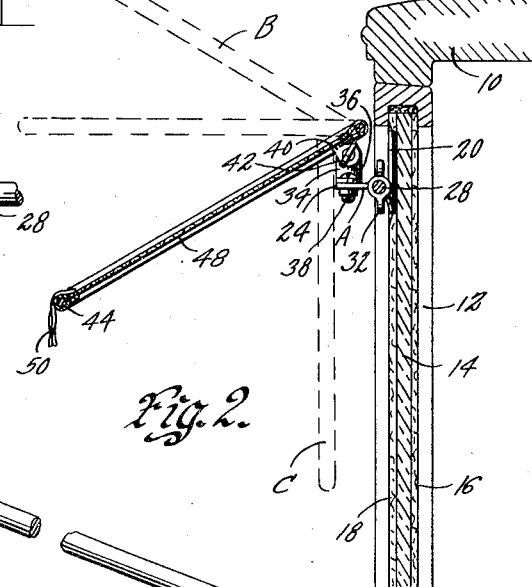
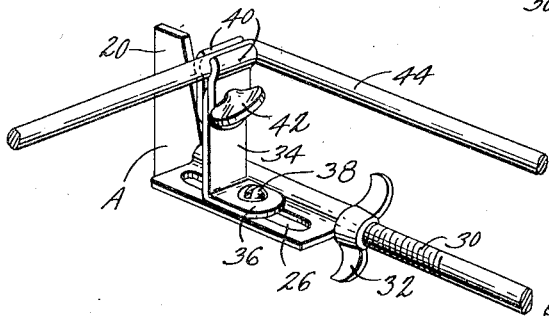
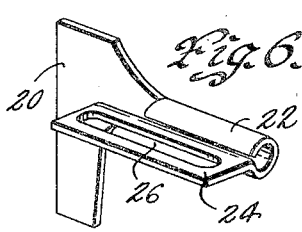
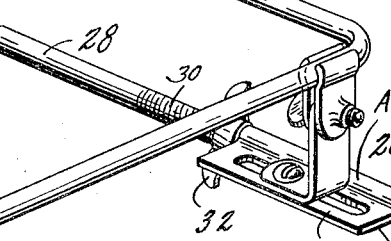
Inventor
William R. Torbert
by Bair & Freeman Attorneys
Witness Patented Mar. 8, 1927.

1,620,500

UNITED STATES PATENT OFFICE.

WILLIAM R. TORBERT, OF KANSAS CITY, MISSOURI.

AWNING STRUCTURE.

Application filed November 5, 1926. Serial No. 146,407.

The object of my invention is to provide an awning structure especially adapted for use upon automobile windows, parts of my device being simple, durable and comparatively inexpensive.

More particularly it is my object to provide an awning structure having parts adapted to coact with the sides of the window frame and to be frictionally engaged therewith so that the awning may be supported upon the window frame.

Still a further object is to provide spreading means whereby the awning structure may be mounted upon the frame and to provide an awning adapted to coact with parts of the spreading means in such a manner as to permit the spreading means to be adjusted without interfering with the awning frame and its mounting upon the spreading means.

Still a further object is to provide fittings adapted to coact with the sides of the window frame in such a manner as not to interfere with the opening or closing of the window proper and to allow the window to be moved to entirely closed position.

With these and other objects in view my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side view of a portion of an automobile of the sedan type with my improved awning structure mounted thereon.

Figure 2 is a sectional view taken on line 2—2 of Figure 1, several positions of the awning being shown in dotted lines.

Figure 3 is a detail sectional view taken on line 3—3 of Figure 1.

Figure 4 is a sectional view taken on line 4—4 of Figure 3, illustrating the mounting of the awning fittings upon the window frame.

Figure 5 is a perspective view of the awning structure with the canvas thereof removed and Figure 6 is a perspective view of one of the fittings forming a part of the spreading means of the awning structure.

In the accompanying drawings I have used the reference numeral 10 to indicate generally an automobile of the sedan or closed model type. The automobile 10 is provided with a pair of window frames 12 in which are slidably mounted windows 14.

The windows 14 are received in window grooves 16 formed in the sides of the window casing or frame 12. Within each window groove 16 is a felt packing 18. My improved awning structure is designed to be mounted within the grooves 16 and on the outside of the felt 18.

The mounting of the awning structure outside of the felt 18 makes it possible to mount the awning structure so that it will not interfere with the glass 14. Further details as to the mounting of my awning structure will hereinafter be more fully set forth.

My improved awning structure comprises a pair of fittings A preferably formed of sheet metal stampings and arranged with a pair of thin blades 20. The blades 20 on their inner ends each have tubular portions 22. The tubular portions 22 are formed out of blanks of material from which the entire fittings A are made and have a portion arranged so as to form a horizontal flange 24.

The horizontal flange 24 is formed with an elongated slot 26. It will be noted that the horizontal flange 26 of each of the fittings A does not extend clear to the end of the blade 20 but terminates short thereof.

The purpose of this is to permit the blades 20 to be slipped in between the felt 18 and and the sides of the window frame 12 within the grooves 16. This is clearly illustrated in Figure 3 of the drawings.

The entire fittings project on the outside of the glass 14 and when so mounted, the glass 14 may be moved to its entirely closed position. In order to retain each of the fittings A in an engagement against the sides of the frame 12, I provide a rod 28 having each of its ends screw threaded as at 30. Upon the screw threaded ends 30 are mounted wing nuts 32.

The wing nuts 32 are adapted to abut against the tubular portions 22 of each of the fittings A. When the nuts 32 are screw threaded upon the portions 30 it will cause the fittings A to be moved apart or permit them to be loose upon the rod 28 depending upon the direction of rotation of the wing nuts 32.

It will be noted that when the fittings A are forced apart that the same will be brought into frictional engagement against the sides of the window frame 12. By screwing the wing nuts tight the fittings A and the tie rod 28 will be mounted upon the window frame 12.

The parts just described may be called the spreading means of my awning structure. In order to mount the awning proper upon the fittings A, I provide an upstanding support 34 having a horizontal flange 36 formed thereon. The flange 36 rests upon the horizontal flange 24 and is connected thereto by the bolt 38.

The bolt 38 extends through the slot 26 so that the upstanding support 34 may be moved longitudinally upon the horizontal flange 26 or the fittings A may be moved without changing the relative position of the upstanding lugs 34.

A pair of clamp fittings 40 are mounted upon the upper ends of the upstanding supports 34 and have a wing bolt 42 extending therethrough and through the support 34. One of the parts of the clamp fittings 40 is screw threaded so that when the wing bolt 42 tightens it will cause the clamp fittings 40 to be frictionally engaged with the upstanding support 34.

Each of the clamp fittings 40 is designed to engage a rod 44 forming a part of the awning frame proper. The awning frame proper is formed of a rod bent to substantially rectangular shape and this is the rod 44.

In order to brace the frame or rod 44, I provide a center cross piece 46. The cross piece 46 may be spot welded or otherwise fastened to the rod 44 so that a rigid awning frame is had. Upon the frame formed by the wires 44 and 46 I mount a suitable flexible awning such as a canvas 48 which may have an ordinary trimming or fringe 50 thereon.

The canvas does not extend around the rod 44 at the points where it is designed to coact with the clamp fittings 40. The angle of the awning and its frame may be varied by simply loosening the wing bolts 42 and tilting the entire awning structure relative to the supports 34.

One of the positions of the awning is illustrated in solid lines in Figure 2 of the drawings and in this same figure is illustrated in dotted lines, a position of the awning which is very desirable when you want it to serve as a ventilator for the automobile.

It will be noted that the window glass 14 is free to move up and down without interference from the fittings A or any of the parts of the awning proper, all of them being mounted on the outside of the glass 14.

By loosening the bolts 38 I am able to move the fittings A away from each other or towards each other without in any way being interfered with from the upstanding lugs 34. After the fittings A have been placed in position and locked by the wing nuts 32, it is necessary to tighten the bolts 38 so that the awning will be supported rigidly upon the fittings and in turn upon the window frame 12.

The ends of the rod 28 extend loosely into the tubular portions 22 of each of the fittings A. When the upstanding lugs 34 and the wire frame 44 is in assembled position then the fittings A will of course be held against spreading movement and from becoming disassembled from the rod 28.

One of the advantages of my structure resides in the fact that the fittings A may be spread apart a sufficient distance to take care of window frames which are of different widths using therewith the same awning frame composed of the wires 44 and 46.

The slots 26 permit the adjustment of the fittings A a greater distance apart or a less distance apart depending upon just what width of window frame it is desired to mount the awning upon.

It will be noted that the awning may be left upon the window frame at all times. When it is desired to have the awning serve as a ventilator it is moved to the position shown by the dotted lines B. If it is desired to have the awning serve as a curtain, then it is moved to the position shown by the dotted lines C.

The awning proper may of course be moved to positions intermediate of the positions shown by the dotted lines B and C.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An awning structure comprising a pair of fittings adapted to engage the sides of a window frame, tubular portions formed on said fittings, a rod having its ends screw threaded and received in said tubular portions, nuts on said screw threaded portions of the rod for engaging the ends of said tubular portions of the fittings, supporting flanges on said fittings and an awning carried by said supporting flanges.

2. An awning structure comprising a pair of fittings adapted to engage the sides of a window frame, tubular portions formed on said fittings, a rod having its ends screw threaded and received in said tubular portions, nuts on said screw threaded portions of the rod for engaging the ends of said tubular portions of the fittings supporting flanges on said fittings and having slots therein, an awning carried by said flanges and connected therewith through said slots whereby the fittings may be adjusted towards or from each other.

3. In combination with a window frame having a groove in each side thereof, an awning structure comprising a pair of blades adapted to be positioned in said grooves, means for moving said blades relative to each other whereby they frictionally engage the bottoms of said grooves, standards slidably mounted on said blades whereby said blades may be moved with said standards remaining in the same position relative to each other, a frame, a canvas covering said frame and means for connecting the frame to said standards.

4. In combination with a window frame having a groove in each side thereof, an awning structure comprising a pair of blades adapted to be positioned in said grooves, means for moving said blades relative to each other whereby they frictionally engage the bottoms of said grooves, standards slidably mounted on said blades, a frame connecting said standards together whereby the blades may be moved without affecting the standards, a canvas covering said frame and means for securing said standards to said blades.

5. In combination with a window frame having a groove in each side thereof, an awning structure comprising a pair of blades adapted to be positioned in said grooves, means for moving said blades relative to each other whereby they frictionally engage the bottoms of said grooves, standards slidably mounted on said blades, a frame, a pair of clamp members pivoted to each standard and engaging said frame, whereby the blades may be moved without affecting the standards, and said frame may be tilted at an angle, a canvas covering said frame and means for securing said standards to said blades.

6. An awning structure comprising a pair of fittings adapted to engage the sides of a window frame, tubular portions formed on said fittings, a rod having its ends screw threaded and received in said tubular portions, nuts on said screw threaded portions of the rod for engaging the ends of said tubular portions of the fittings, supporting flanges on said fittings, standards on said supporting flanges, a clamp member on each side of each standard, an awning comprising a frame of rod material, a canvas covering therefor, the clamp member on each standard engaging the sides of the rod material comprising said frame and a thumb screw extending through each standard and the clamp members on each side thereof for forming a pivot joint capable of being tightened.

7. An awning structure comprising a pair of fittings adapted to engage the sides of a window frame, tubular portions formed on said fittings, a rod having its ends screw threaded and received in said tubular portions, nuts on said screw threaded portions of the rod for engaging the ends of said tubular portions of the fittings, supporting flanges on said fittings, standards on said supporting flanges, a clamp member on each side of each standard, an awning comprising a frame of rod material, a canvas covering therefor, the clamp member on each standard engaging the sides of the rod material comprising said frame and a thumb screw extending through each standard and the clamp members on each side thereof for forming a pivot joint capable of being tightened whereby pivotal movement of the awning relative to the fittings and standards may be prevented and the clamp members will frictionally engage the awning frame.

WILLIAM R. TORBERT.